United States Patent
Wu et al.

(10) Patent No.: US 9,838,676 B2
(45) Date of Patent: Dec. 5, 2017

(54) THREE-DIMENSIONAL DISPLAY DEVICE

(71) Applicant: BOE TECHNOLOGY GROUP CO., LTD., Beijing (CN)

(72) Inventors: Kun Wu, Beijing (CN); Tao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 268 days.

(21) Appl. No.: 14/771,015

(22) PCT Filed: Dec. 17, 2014

(86) PCT No.: PCT/CN2014/094089
§ 371 (c)(1),
(2) Date: Aug. 27, 2015

(87) PCT Pub. No.: WO2016/015435
PCT Pub. Date: Feb. 4, 2016

(65) Prior Publication Data
US 2016/0366401 A1   Dec. 15, 2016

(30) Foreign Application Priority Data

Jul. 31, 2014   (CN) .......................... 2014 1 0373908

(51) Int. Cl.
*G02F 1/1335*   (2006.01)
*H04N 13/04*    (2006.01)
(Continued)

(52) U.S. Cl.
CPC ..... *H04N 13/0454* (2013.01); *G02B 27/2214* (2013.01); *G02F 1/13* (2013.01);
(Continued)

(58) Field of Classification Search
CPC ................................................ G02B 27/2214
See application file for complete search history.

(56) References Cited

U.S. PATENT DOCUMENTS

2006/0012593 A1   1/2006   Iriguchi et al.
2007/0296896 A1   12/2007  Hong et al.
(Continued)

FOREIGN PATENT DOCUMENTS

CN   1721961 A    1/2006
CN   102014289 A  4/2011
(Continued)

OTHER PUBLICATIONS

Second Chinese Office Action dated Jun. 12, 2016; Appl. No. 201410373908.7.
(Continued)

*Primary Examiner* — Wen-Ying P Chen
(74) *Attorney, Agent, or Firm* — Ladas & Parry LLP

(57) ABSTRACT

Embodiments of the present invention provide a 3D display device, and the 3D display device, comprising: a display panel (1), configured to display an image; an optical element (2) and a liquid crystal lens (3), disposed to overlap each other and positioned at a light exiting side of the display panel (1), wherein the optical element (2) comprises a plurality of optical lens units (2a), the liquid crystal lens (3) comprises a plurality of liquid crystal lens units (3a), the plurality of liquid crystal lens units (3a) correspond to the plurality of optical lens units (2a) in a one-to-one corresponding relationship; when the 3D display device is in a 2D displaying mode, each of the plurality of liquid crystal lens units (3a) has an effect on light contrary to an effect on the light of each of the plurality of optical lens units (2a), and when the 3D display device is in a 3D displaying mode, the liquid crystal lens unit (3a) is configured to have a plane glass function. The 3D display device provided by the embodiments of the present invention can be switched between 2D and 3D displaying, and can reduce the crosstalk during 3D displaying and improve the display effect.

14 Claims, 3 Drawing Sheets

(51) Int. Cl.
*G02F 1/13* (2006.01)
*G02B 27/22* (2006.01)
*G02F 1/1337* (2006.01)
*G02F 1/1343* (2006.01)
*G02F 1/137* (2006.01)
G02F 1/29 (2006.01)
G02F 1/1347 (2006.01)
G02B 1/04 (2006.01)

(52) U.S. Cl.
CPC ............ *G02F 1/137* (2013.01); *G02F 1/1337* (2013.01); *G02F 1/13439* (2013.01); *G02F 1/134309* (2013.01); *H04N 13/0404* (2013.01); G02B 1/041 (2013.01); G02F 1/13471 (2013.01); G02F 1/133526 (2013.01); G02F 2001/294 (2013.01); G02F 2202/28 (2013.01); H04N 2213/001 (2013.01)

(56) References Cited

U.S. PATENT DOCUMENTS

2008/0252720 A1* 10/2008 Kim ................... H04N 13/0404
                                                                    348/59
2011/0050683 A1    3/2011  Yun et al.
2012/0320288 A1* 12/2012  Baek ....................... G02B 3/14
                                                                    349/5
2014/0160381 A1    6/2014  Wang et al.
2015/0355472 A1   12/2015  Niioka et al.

FOREIGN PATENT DOCUMENTS

| | | |
|---|---|---|
| CN | 102279494 A | 12/2011 |
| CN | 202929338 U | 5/2013 |
| CN | 103777396 A | 5/2014 |
| JP | 2013-015613 A | 1/2013 |
| KR | 20080105572 A | 12/2008 |
| KR | 101307774 B1 | 9/2013 |

OTHER PUBLICATIONS

International Preliminary Report on Patentability issued Jan. 31, 2017; PCT/CN2014094089.

First Chinese Office Action Appln. No. 201410373908.7; dated Dec. 30, 2015.

* cited by examiner

THREE-DIMENSIONAL DISPLAY DEVICE

TECHNICAL FIELD

Embodiments of the present invention relate to a three-dimensional (3D) display device.

BACKGROUND

Naked-eye stereoscopic display is very popular in the three-dimensional (3D) stereoscopic display field as a viewer does not need to wear a glasses.

As shown in FIG. 1, a current common naked-eye stereoscopic display device mainly comprises: a display panel 1'; and a light splitting member 3', disposed at a light exiting side of the display panel 1', wherein the light splitting member 3' may be adhered to the display panel 1' via an adhesive layer 4', pixels of the display panel are divided into left eye pixels and right eye pixels, and then two different images are respectively provided to a left eye and a right eye of a viewer, and depth of field is formed by using the parallax effect between a left eye image and a right eye image, and further a stereoscopic display effect is produced. The light splitting member mainly comprises: a parallax barrier, for example, a liquid crystal grating, a lenticular lens, for example, a liquid crystal lens and etc.

With a display device using the parallax barrier comprising a light shielding region and a light transmitting region, due to the light shielding region, the brightness of the display device in a 3D displaying mode is seriously reduced, in order to improve the brightness, the liquid crystal lens without brightness loss, which can be switched between 2D and 3D displaying modes, is commonly used. However, as shown in FIGS. 1 and 2, a X coordinate in FIG. 2 is a position on the liquid crystal lens, a Y coordinate is phase retardation, the light splitting member 3' is the liquid crystal lens comprising a plurality of liquid crystal lens units, and the crosstalk appears during 3D displaying due to disordered arrangement of liquid crystal molecules at a boundary region of adjacent liquid crystal lens units.

In addition, in order to match a preset viewing distance of a full high-definition display device and a distance between the light splitting member and the display panel, the liquid crystal lens needs to adopt a relatively thick liquid crystal layer and a relatively large liquid crystal refractive index, for example, a 13.3-inch full high-definition display device has a preset viewing distance of 600 mm, and the distance between the liquid crystal lens and the display panel is 1 mm, and then, the liquid crystal layer of the liquid crystal lens has a thickness of 40 μm, and the liquid crystal refractive index is above 0.3. As shown in FIG. 3, the X coordinate in FIG. 3 is a position on the liquid crystal lens, and the Y coordinate is a phase retardation amount, wherein a smooth curve is a theory curve, while the other curve is a simulated phase retardation curve; when the liquid crystal layer of the liquid crystal lens has a relatively large thickness, the alignment function of an alignment layer to liquid crystal molecules at a center position of the liquid crystal layer is weakened, the theory curve is more smooth than the phase retardation curve of the liquid crystal lens during achieving the 3D displaying, thereby causing crosstalk during 3D displaying, and the 3D displaying effect is relative bad.

SUMMARY

Embodiments of the present invention provide a 3D display device, which can be switched between 2D and 3D displaying modes, can reduce a thickness of a liquid crystal layer in a liquid crystal lens, reduce crosstalk during 3D displaying mode, and improve display effect.

An embodiment of the present invention provides a 3D display device, comprising: a display panel, configured to display an image; an optical element and a liquid crystal lens, disposed to overlap each other and positioned at a light exiting side of the display panel, wherein the optical element comprises a plurality of optical lens units, the liquid crystal lens comprises a plurality of liquid crystal lens units, and the plurality of liquid crystal lens units correspond to the plurality of optical lens units in a one-to-one corresponding relationship, when the 3D display device is in a 2D displaying mode, each of the plurality of liquid crystal lens units has an effect on light contrary to an effect on the light of each of the plurality of optical lens units, and when the 3D display device is in a 3D displaying mode, the liquid crystal lens units are configured to have a plane glass function.

BRIEF DESCRIPTION OF THE DRAWINGS

In order to illustrate the technical solution of the embodiments of the invention more clearly, the drawings of the embodiments will be briefly introduced below; it is obvious that the drawings as described below are only related to some embodiments of the invention, and are not construed as limiting of the present invention.

DETAILED DESCRIPTION

Figure 1:
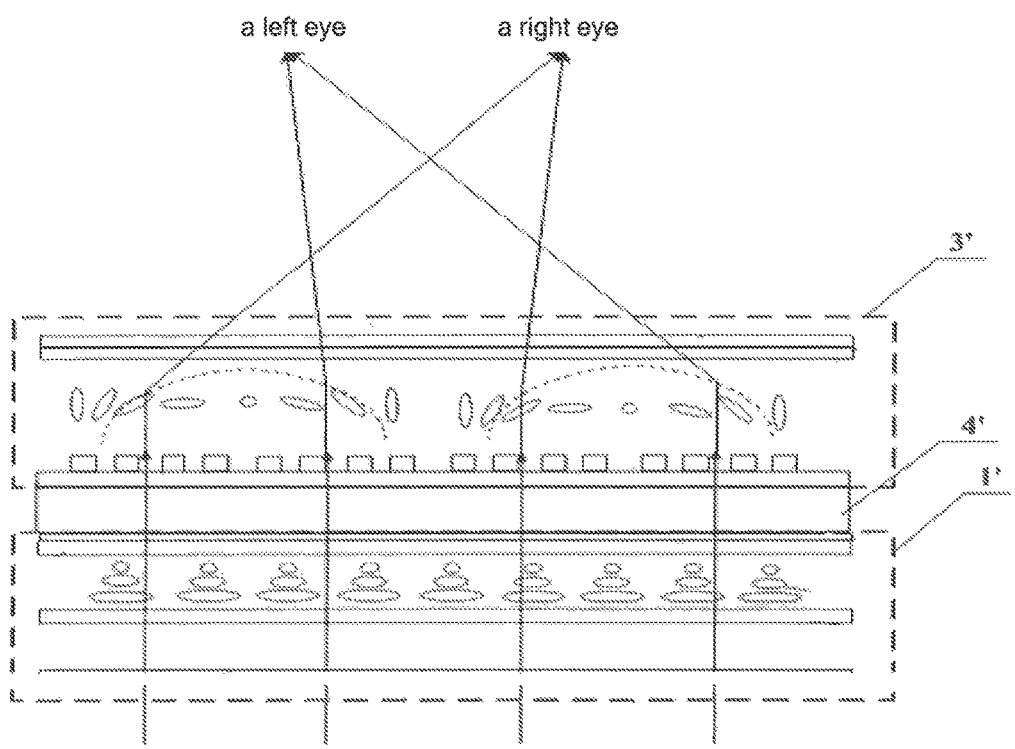
FIG. 1 is a schematic principle view of a current 3D displaying.
Figure 2:
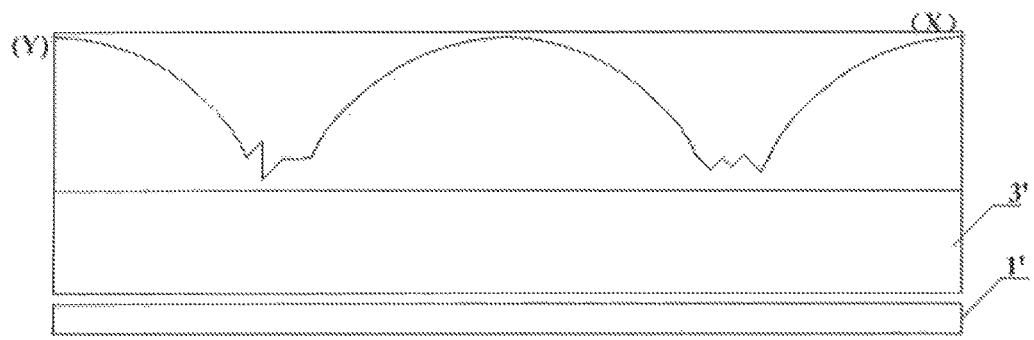
FIG. 2 is a phase retardation curve view of a liquid crystal lens when the liquid crystal lens is used to achieve the 3D displaying in the prior art.
Figure 3:
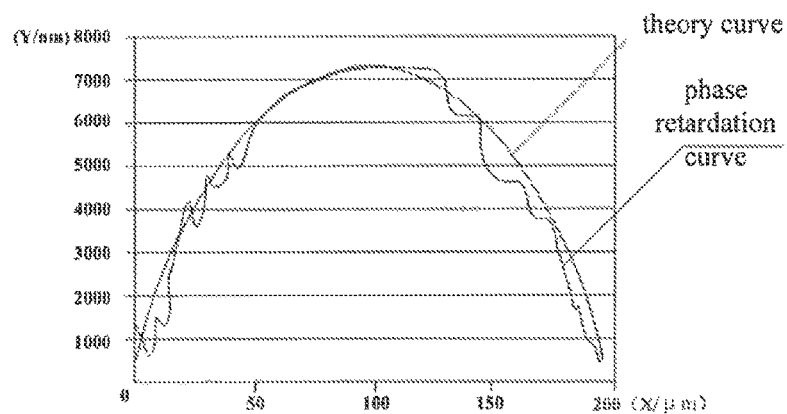
FIG. 3 is another phase retardation curve view of a liquid crystal lens when the liquid crystal lens is used to achieve the 3D displaying in the prior art.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A 3D display device provided by an embodiment of the present invention may be switched between 2D and 3D displaying modes and can reduce the crosstalk during the 3D displaying and improve the display effect. In the technical solution, the switching between the 2D and 3D displaying modes can be achieved by combining a optical element with a liquid crystal lens and controlling the arrangement of liquid crystal molecules of the liquid crystal lens, and liquid crystal layer in the liquid crystal lens has a reduced thickness, the liquid crystal lens is configured to have a plane glass effect in the 3D displaying mode, thereby reducing the crosstalk during the 3D displaying and improving the display effect.

The following is a detailed description to the embodiments of the present invention referring to the drawings. A thicknesses of and a size and a shape of a layer or a region in the figures do not reflect the real proportion of a 3D display device, and they are only intended to explain the contents of the embodiments of the present invention.

Figure 4:
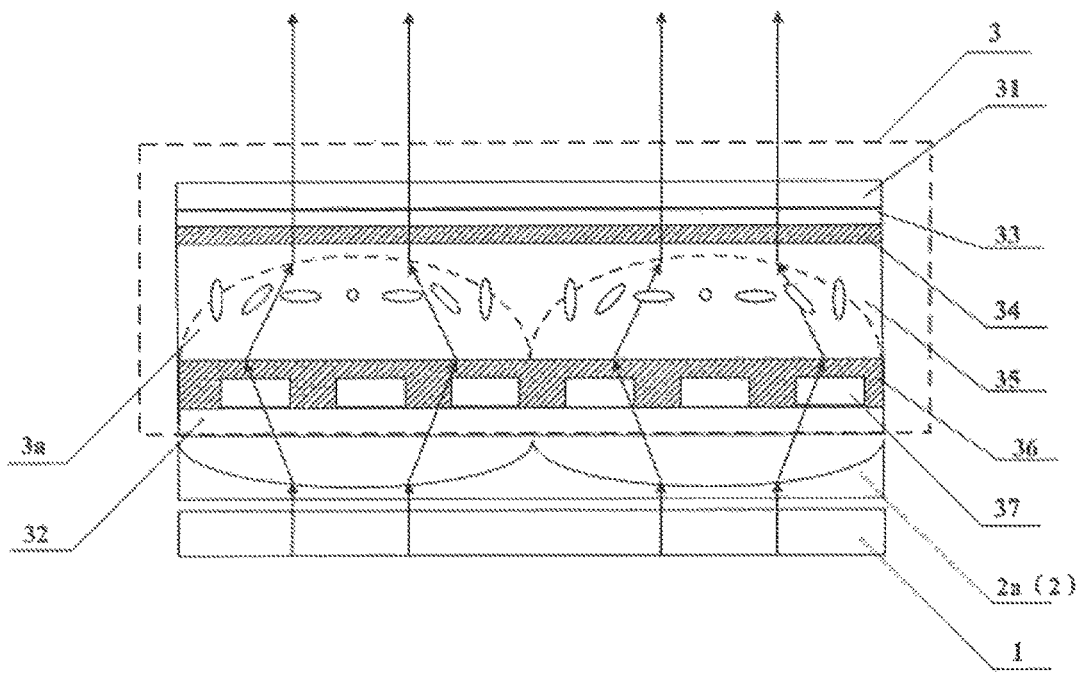
FIG. 4 is a light path view of a 3D display device in a 2D displaying mode according to an embodiment of the present invention.
Figure 5:
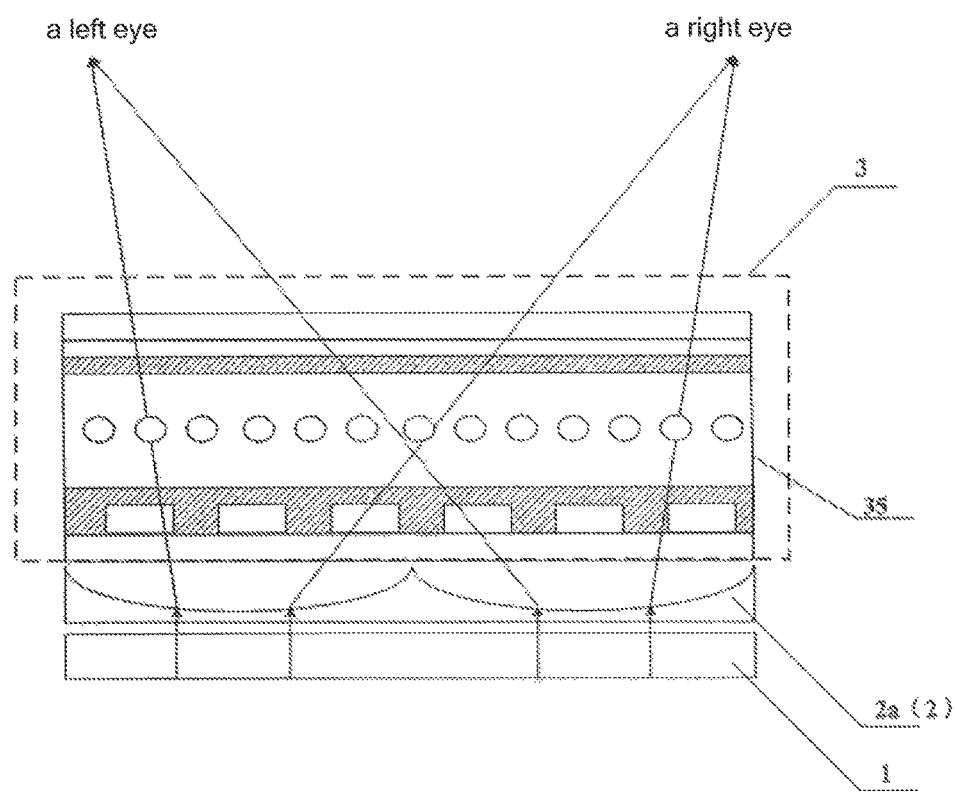
FIG. 5 is a light path view of a 3D display device in a 3D displaying mode according to an embodiment of the present application.

As shown in FIGS. 4 and 5, a three-dimensional (3D) display device according to an embodiment of the present invention comprises: a display panel 1, configured to display an image; and an optical element 2 and a liquid crystal lens 3 disposed to overlap each other and located at a light exiting side of the display panel 1, wherein the optical element 2 comprises a plurality of optical lens units 2a, the liquid crystal lens 3 comprises a plurality of liquid crystal lens units 3a, and the plurality of liquid crystal lens units 3a correspond to the plurality of optical lens units 2a in a one-to-one correspondence relationship; when the 3D display device is in a 2D displaying mode, the liquid crystal lens unit 3a is configured to have an opposite effect to light compared with the optical lens unit 2a, and as shown in a light path of FIG. 4; the liquid crystal lens unit 3a is configured to have a plane glass function when the 3D display device is in a 3D displaying mode, as shown by a light path in FIG. 5.

It should be explained that the liquid crystal lens unit 3a may form a liquid crystal lens unit that has the opposite function to light compared with the optical lens unit 2a in the 2D displaying mode, that is, when the optical lens unit 2a is a concave lens, the liquid crystal lens unit 3a has a function of a convex lens as being electrified; when the optical lens unit 2a is a convex lens, the liquid crystal lens unit 3a has a function of a concave lens as being electrified, wherein the concave lens has a light diverging function, while the convex lens has a light converging function. Of course, the liquid crystal lens units may achieve the function as a plane light-transmitting glass as being not electrified.

Exemplarily, a relative position of the optical element 2 and the liquid crystal lens 3 may be that the optical element 2 is above the liquid crystal lens 3, or the liquid crystal lens 3 is above the optical element 2, which is not defined specifically herein.

The following is a description of an embodiment of the present invention, taking it as an example that the liquid crystal lens 3 is above the optical element 2, the optical lens unit 2a is a concave lens, and the liquid crystal lens unit 3a has the function as a convex lens as being electrified.

The liquid crystal lens is a grating structure having the lens function and at least comprising a liquid crystal layer and electrodes located at two sides of the liquid crystal layer. Liquid crystal molecules are deflected under the action of an electrical field formed by the electrodes at the two sides of the liquid crystal layer, so that the entire liquid crystal lens has the function as a convex lens; the liquid crystal molecules are arranged horizontally in a condition that no electrical field is formed, so that the liquid crystal lens has a light transmitting function of a plane glass. As shown in FIG. 4, the liquid crystal lens 3 comprises a plurality of liquid crystal lens units 3a, which correspond to the plurality of optical lens units 2a of the optical element 2 in a one-to-one correspondence relationship and each liquid crystal lens unit 3a has a function of one convex lens.

With a display device according to the embodiment, when in the 3D displaying mode, as shown in FIG. 5, by controlling an arrangement method of liquid crystal molecules in the liquid crystal lens, the liquid crystal lens does not block any light, i.e., the liquid crystal lens has a function of a plane glass, and meanwhile, a left eye image is input into left eye pixels of the display panel, a right eye image is input into right eye pixels of the display panel, light emitted from the left eye pixels is irradiated to a left eye of a viewer through the optical element, light emitted from the right eye pixels is irradiated to a right eye of the viewer through the optical element, and then the 3D displaying effect is achieved. Compared with the prior art using the liquid crystal lens to achieve the 3D displaying, the optical element can be easily made at a low cost and is not affected by factors such as an voltage in the application process, and thus, in the 3D displaying, crosstalk does not easily appear, the 3D displaying effect is improved and good stereoscopic effect is obtained.

With the display device according to the embodiment, when in the 2D displaying mode, as shown in FIG. 4, by controlling an arrangement method of the liquid crystal molecules in the liquid crystal lens, the liquid crystal lens has the function of convex lens, meanwhile, all of the pixels of the display panel display the same image, and then, as the liquid crystal lens has the function of the convex lens, while the optical lens unit has the function of a concave lens, that is, the phase retardation of light emitted from the pixels of the display panel, which is caused after passing through the optical element, can be compensated by the liquid crystal lens, thereby achieving the 2D display effect. In the 2D displaying mode, even if the phase retardation curve of the liquid crystal lens is not so perfect and the twisting phase deviation occurs at a boundary region of adjacent liquid crystal lens units, all of the pixels display the same image, thus the crosstalk generated by the liquid crystal lens exerts less influence on the viewer in viewing an image, thus the display effect of the 2D display is improved.

From the above analysis, the above 3D display device may be switched between the 2D and 3D displaying modes by controlling the arrangement method of the liquid crystal molecules in the liquid crystal lens, and the display effect during 2D display and 3D displaying can be improved obviously. In addition, the 3D display device only comprises a display panel, an optical element and a liquid crystal lens, the entire display device has a simple structure and an operation for controlling the switching between 2D and 3D displaying modes is simple and convenient.

Exemplarily, in an embodiment of the present invention, the relative position between the optical element and the liquid crystal lens may be that: the optical element is disposed above the liquid crystal lens, or, the liquid crystal lens is disposed above the optical element, which is not defined specifically herein; and there may be a gap between the liquid crystal lens and the optical element, or the gap may not exist.

Exemplarily, the optical element may be adhered to the liquid crystal lens by an adhesive mode, or other adhering method known by the inventor or the inventors, which is not specifically defined by the embodiment of the present invention.

Exemplarily, in the embodiment of the present invention, by controlling the arrangement method of the liquid crystal molecules in the liquid crystal lens and combining the optical element and the liquid crystal lens, the 2D display may be achieved as follows:

Referring to FIG. 4, when the optical lens unit is a concave lens, in order to compensate phase retardation of light emitted from the left eye pixels and the right eye pixels after passing through the optical element and to achieve the 2D display, the arrangement method of the liquid crystal molecules in the liquid crystal lens is controlled so that the liquid crystal lens has a function of a convex lens; as shown in FIG. 4, after being transmitted through the optical lens units 2a, parallel light emitted from the pixels of the display panel is changed into diverging light, the diverging light is converged after passing through the liquid crystal lens with the convex lens function, so as to change into parallel light again after passing through the liquid crystal lens unit 3a; or, when the optical lens unit 2a is a convex lens, the arrangement method of the liquid crystal molecules in the liquid crystal lens is controlled so that the liquid crystal lens unit 3a has a function of a concave lens, after being transmitted through the optical lens units 2a, the parallel light emitted from the pixels of the display panel as shown in FIG. 4 is changed into a converged light, and the converged light is diverged after passing through the liquid crystal lens with a convex lens function, and thereby the light is re-changed into parallel light after passing through the liquid crystal lens unit 3a. That is, in order to achieve 21) display, the arrangement method of the liquid crystal molecules in the liquid crystal lens is controlled, so that the liquid crystal lens has a function of a convex lens or a concave lens.

Exemplarily, a focus position of the liquid crystal lens unit 3a is consistent with that of the optical lens unit 2a.

The liquid crystal lens in the display device provided by an embodiment of the present invention may have a plurality of structures, for example, as shown in FIG. 4, the liquid crystal lens comprises:

an upper substrate 31; and a lower substrate 32, disposed opposite to the upper substrate 31; a liquid crystal layer 35, disposed between the upper substrate 31 and the lower substrate 32; a first transparent electrode 33, disposed on a side close to the liquid crystal layer 35 of the upper substrate 31; a second transparent electrode 37, disposed on a side close to the liquid crystal layer 35 of the lower substrate 32; a first alignment film 34, disposed on a side close to the liquid crystal layer 35 of the first transparent electrode 33; and a second alignment film 36, disposed on a side close to the liquid crystal layer 35 of the second transparent electrode 37.

Exemplarily, as shown in FIG. 4, the first transparent electrode 33 may be a plate-like electrode, and the second transparent electrode 37 may comprises a plurality of strip-like electrodes parallel to each other and spaced from each other at an interval; or the first transparent electrode in the embodiment of the present invention may comprises a plurality of strip-like electrodes parallel to each other and spaced from each other at an interval, and the second transparent electrode may be a plate-like electrode.

When the first transparent electrode and the second transparent electrode are not applied any voltage, as shown in FIG. 5, the liquid crystal molecules are arranged in a direction of the alignment film, i.e., arranged in a direction parallel to the upper substrate. The liquid crystal lens has the function of a plane glass, and light can be transmitted through the liquid crystal lens without any blocking.

When the first transparent electrode and the second transparent electrode are respectively applied voltages, different electric field strengths are produced by applying different voltages to the strip-like electrodes (corresponding to the second transparent electrodes in FIG. 4) at different positions, so that the corresponding liquid crystal molecules are deflected in different degrees, and thereby the liquid crystal layer generates the convex lens or concave lens effect, as shown in FIG. 4, the liquid crystal lens has the function of a plurality of convex lenses, that is, it comprises a plurality of liquid crystal convex lens units.

Exemplarily, when there is a gap between the liquid crystal lens and the optical element, difference between focal length of the liquid crystal lens unit and that of the optical element is equal to a thickness of the substrate close to the optical element in the liquid crystal lens.

The plurality of lens units of the optical element in the 3D display device provided by the embodiments of the present invention may have a plurality of structures, for example, in order to simplify the manufacturing process, they may be a plurality of column-like lens units parallel and adjacent to each other, exemplarily, an extending direction of the column-like lens units is not limited, for example, it may be a same as an extending direction of gate lines of the display device or a same as an extending direction of data lines of the display device, or form a set angle with the extending direction of the gate lines of the display device, which is not limited specifically herein and may be determined according to the specific process.

The 3D display device according to embodiments of the present invention can be switched between the 2D and 3D displaying modes, in the 2D displaying mode, the first transparent electrode and the second transparent electrode of the liquid crystal lens are electrified, the arrangement method of the liquid crystal molecules in the liquid crystal lens is controlled so that the function of the liquid crystal lens unit in the liquid crystal lens to the light is opposite to that of the optical lens unit to the light, and then, all of the pixels of the display panel display the same image, light emitted from all of the pixels is transmitted through the optical element and the liquid crystal lens and by overlapping the optical functions of the optical element and the liquid crystal lens, the 2D display effect is achieved; in the 3D displaying mode, the first transparent electrode and the second transparent electrode of the liquid crystal lens are not applied voltage, the liquid crystal lens is equivalent to the plane glass, so that the left eye pixels of the display panel display the left eye image, the right eye pixels of the display panel display the right eye image, light emitted from the left eye pixels is irradiated to the left eye of the viewer through the optical element, light emitted from the right eye pixels is irradiated to the right eye of the viewer through the optical element, thus the 3D displaying effect is achieved. Thus, in the 3D displaying mode, separation of the left eye image and the right eye image is achieved without using the light splitting function of the liquid crystal lens, thus a thickness of the liquid crystal layer of the liquid crystal lens can be reduced, thereby further alleviating the crosstalk in the 3D displaying mode and improving the display effect.

Apparently, various modifications and variants can be made to embodiments of the invention by those skilled in the art without departing from the spirit and scope of the invention. As such, provided that these modifications and variants of the invention fall within the scope of claims of the invention and equivalent technologies thereof, it is also intended for the invention to embrace them therein.

The present application claims the priority of the Chinese patent application No. 201410373908.7 filed on Jul. 31, 2014, and the disclosure of Chinese patent application is incorporated herein on its entirety as a part of the present application.

The invention claimed is:

1. A three-dimensional (3D) display device, comprising:
a display panel, configured to display an image;
an optical element and a liquid crystal lens, disposed to overlap each other and positioned at a light exiting side of the display panel,
wherein the optical element comprises a plurality of optical lens units, the liquid crystal lens comprises a plurality of liquid crystal lens units, and the plurality of liquid crystal lens units correspond to the plurality of optical lens units in a one-to-one corresponding relationship, when the 3D display device is in a 2D displaying mode, each of the plurality of liquid crystal lens units has an effect on light contrary to an effect on the light of each of the plurality of optical lens units, and when the 3D display device is in a 3D displaying mode, the liquid crystal lens units are configured to have a plane glass function.

2. The 3D display device according to claim 1, wherein the optical lens unit is a concave lens, the liquid crystal lens unit is formed to have a convex lens effect in the 2D displaying mode; or, the optical lens unit is a convex lens unit, and the liquid crystal lens unit is formed to have a concave lens effect in the 2D displaying mode.

3. The 3D display device according to claim 2, wherein a focus position of the optical lens unit is consistent with that of the liquid crystal lens unit.

4. The 3D display device according to claim 1, wherein the optical element is located at a light exiting side of the liquid crystal lens; or, the liquid crystal lens is located at a light exiting side of the optical element.

5. The 3D display device according to claim 1, wherein the liquid crystal lens comprises:

an upper substrate;

a lower substrate, disposed opposite to the upper substrate;

a liquid crystal layer, disposed between the upper substrate and the lower substrate;

a first transparent electrode, disposed on a side close to the liquid crystal layer of the upper substrate;

a second transparent electrode, disposed on a side closed to the liquid crystal layer of the lower substrate;

a first alignment film, disposed on a side closed to the liquid crystal layer of the first transparent electrode; and a second alignment film, disposed on a side closed to the liquid crystal layer of the second transparent electrode, and in the 2D displaying mode, a voltage is applied to the first transparent electrode and the second transparent electrode to produce an electric field, so that liquid crystal molecules in the liquid crystal layer deflect, and the liquid crystal lens unit is configured to have a contrary effect on light compared with the optical lens unit.

6. The 3D display device according to claim 5, wherein the first transparent electrode is a plate-like electrode, and the second transparent electrode comprises a plurality of strip-like electrodes parallel to each other and spaced from each other at an interval.

7. The 3D display device according to claim 5, wherein the first transparent electrode comprises a plurality of strip-like electrodes parallel to each other and spaced from each other at an interval, and the second transparent electrode is a plate-like electrode.

8. The 3D display device according to claim 1, wherein the plurality of optical lens units are a plurality of column-like lens units in parallel and adjacent to each other.

9. The 3D display device according to claim 8, wherein an extending direction of the column-like lens units is a same as an extending direction of gate lines of the display device.

10. The 3D display device according to claim 8, wherein an extending direction of the column-like lens units is a same as an extending direction of data lines of the display device.

11. The 3D display device according to claim 8, wherein an extending direction of the column-like lens units forms a set angle with an extending direction of gate lines of the display device.

12. The 3D display device according to claim 1, wherein a gap is formed between the optical element and the liquid crystal lens.

13. The 3D display device according to claim 1, wherein no gap is formed between the optical element and the liquid crystal lens.

14. The 3D display device according to claim 1, wherein the optical element is adhered to the liquid crystal lens by an adhesive mode.

* * * * *